Patented Oct. 27, 1931

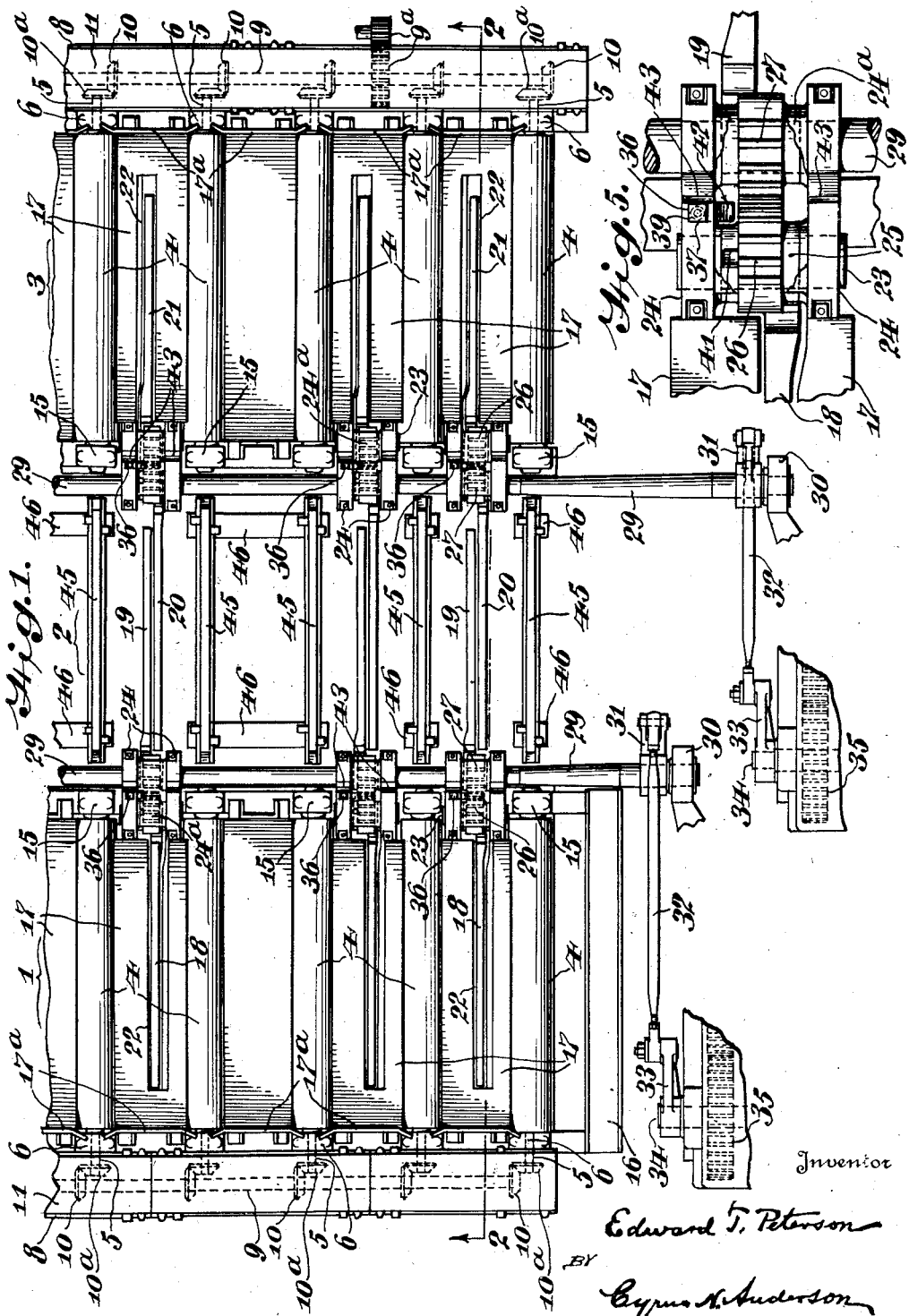

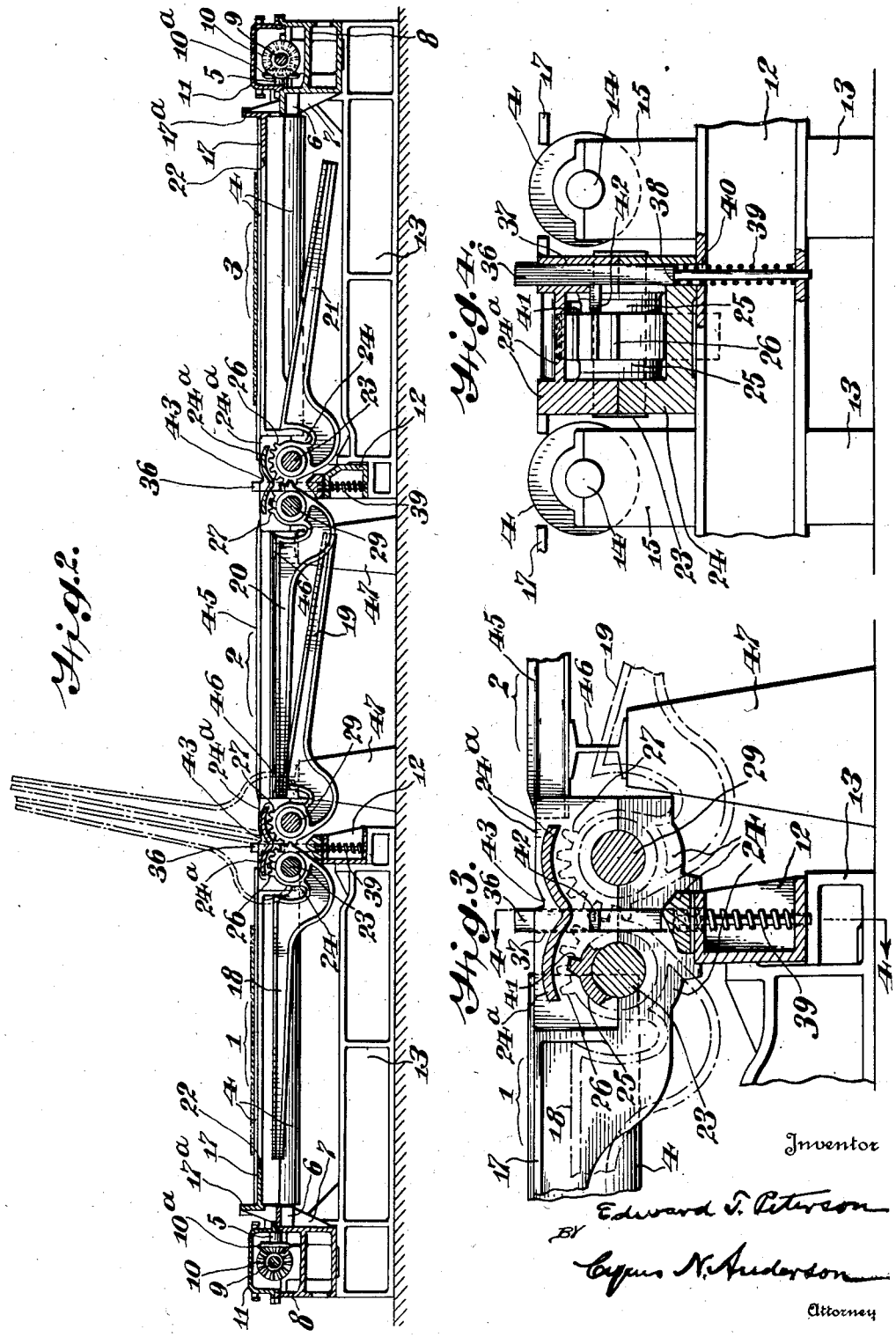

1,828,909

UNITED STATES PATENT OFFICE

EDWARD T. PETERSON, OF READING, PENNSYLVANIA, ASSIGNOR TO BIRDSBORO STEEL FOUNDRY AND MACHINE COMPANY, OF BIRDSBORO, PENNSYLVANIA, A CORPORATION OF PENNSYLVANIA

PLATE TURNOVER MECHANISM

Application filed November 15, 1928. Serial No. 319,527.

My invention relates to apparatus for handling rolled metal bars, and while capable of being employed for handling bars of various shapes, it is particularly well adapted for handling relatively flat bars or plates.

The general object of my invention is to provide mechanism of novel construction for turning over flat bars or plates to permit inspection of the under as well as the top sides thereof.

It also is an object of my invention to provide novel apparatus which embodies means for turning over plates of various lengths for inspecting the under side thereof and which also includes means for again turning the said plates so that at the completion of the turning movements the top sides thereof will face upwardly.

A further object of my invention is to provide mechanism of novel construction which includes a receiving table comprising rollers, a stationary inspection table, and a delivery table comprising rollers, means being interposed between the receiving table and the inspection table for transferring a bar or plate from the former to the latter and for simultaneously turning over the said bar or plate to permit inspection of the under side thereof, the said mechanism also embodying means which is interposed between the inspection table and the delivery table for again turning the bar or plate so that the top side thereof will face upwardly.

A further object of my invention is to provide a novel construction of means which embodies a plurality of lifting arms for lifting a bar or plate from a receiving table and for rotating the said bar or plate about one edge thereof as an axis, and a complementary set of receiving or lowering arms in operative relation to the lifting arms for engaging the bar or plate and lowering the same into horizontal position.

A still further object of my invention is to provide novel apparatus of the character indicated which includes a plurality of lifting arms which may be operated simultaneously in one direction for lifting a plate and for rotating the same about one of its edges as an axis and which also includes means for preventing edgewise movement of the plate during the rotation thereof into vertical or nearly vertical position.

It also is an object of my invention to provide mechanism of novel construction which includes a plurality of arms which cooperate to lift and turn a plate or bar about one of its edges and a plurality of lowering arms which are adapted to be brought into position to engage the said plate or bar after the same has been rotated or turned about one of the edges thereof as an axis, stops being interposed between the lifting arms and the lowering arms for preventing edgewise movement of the plate during the period in which the lowering arms are being brought into position to engage the said plate.

Other objects and advantages from a practical standpoint of the said invention will be pointed out in the detailed description which follows, or will become apparent from such description.

In order that the invention may be comprehended more readily and its manifold practical advantages more fully appreciated reference should be had to the accompanying drawings, in which I have illustrated one form of embodiment thereof. But it should be understood that the invention is susceptible of being embodied in other forms of construction than that shown and that changes in the details of construction thereof may be made within the scope of the claims without departing from the said invention or the principles thereof.

In the drawings:—

Fig. 1 is a view in top plan of the front end portion of mechanism embodying the invention;

Fig. 2 is a view in vertical sectional elevation taken on the line 2—2 of Fig. 1;

Fig. 3 is a view in vertical section of a fragmentary portion of the mechanism shown in Fig. 2, the said view being enlarged to more clearly illustrate certain details of construction;

Fig. 4 is a view in vertical sectional elevation taken on the line 4—4 of Fig. 3; and Fig. 5 is a view in top plan of the construction shown in Fig. 3, a portion thereof being broken away to show certain details of construction.

In the drawings, 1 designates as a whole a plate receiving table, 2 a stationary inspection table, and 3 a plate delivery table.

The receiving table and the delivery table are practically identical in construction, and description of one will suffice for both.

Each of the tables comprises horizontally disposed rollers 4, which are supported transversely along the length of the table. The outer ends of the rollers are provided with journals 5, which extend through bearings 6 formed in the inwardly projecting portions 7 of the longitudinally extending girder or beam 8. The girder 8 constitutes the lower or bottom section of a drive shaft casing in which the shaft 9 is supported rotatably by means of suitable bearings (not shown). Miter gears 10 are mounted at intervals on the said shaft, which gears mesh with similar gears 10ᵃ mounted on the outer ends of the journals 5, which journals extend into the drive shaft casing, as shown in Fig. 2. Any suitable means may be provided for driving the shaft 9, such as the reduction gearing a portion of which is shown at 9ᵃ connected to the drive shaft of the table 3. The drive shaft casing is provided with a cover 11. The girder 8 is supported in fixed spaced relation to the longitudinally extending girder 12, the said girders being mounted upon the outer and inner ends respectively of transversely extending supports or separators 13. The inner ends of the rollers 4 are provided with journals 14 which extend through suitable bearings upon the supports 15 mounted at intervals on the top side of the girder 12 (Fig. 4).

The front ends of the girders 8 and 12 of the table 1 are extended forwardly, as shown in Fig. 1, to provide supports for the transversely extending member 16 which constitutes a stop for preventing bars or plates from being discharged from the front end of the machine.

Apron plates 17 are supported at their opposite ends upon the girders 8 and 12, the said plates being positioned intermediate the rollers 4. The outer ends of these plates are provided with upwardly extending projections 17ᵃ for preventing a plate or the like from running off the table as it is delivered by the rollers 4.

In order to effect transfer of a plate or bar from the roller receiving table to the inspection table and to turn over the said plate or bar I have provided a couple of sets of arms 18 and 19. These arms and the mechanism for supporting and actuating the same are identical in construction with the arms 20 and 21, the latter being provided for transferring a plate or bar from the inspection table to the roller delivery table and for turning over the said plate or bar so that the top side thereof will face upwardly when it is delivered from the machine. It therefore is necessary to describe only one of these transferring and turn-over mechanisms. The arms 18 are normally disposed in substantially horizontal position beneath the apron plates, which plates are provided with slots 22 through which the said arms are adapted to be raised and lowered. Each of the said arms 18 is supported by trunnions 23, which trunnions are journaled in bearings 24 provided upon the inner ends of the apron plates 17. Each of the casings is provided with a cover 24ᵃ. The hub portions 25 of the said arms are provided with gear teeth 26 on a portion of the peripheries thereof which mesh with similar gear teeth 27 formed on the hubs of the complementary arms 19 rigidly mounted on the longitudinally extending shaft 29, which shaft is journaled in suitable bearings provided in each of the bearing casings 24. The front end of the shaft 29 extends through and is supported by a bearing 30 of suitable construction. A crank arm 31 connected to a link 32 connected to a crank arm 33 mounted upon the shaft 34 upon which is mounted one of the gears of the reduction gearing designated generally at 35 provides means for oscillating the shaft 29 to raise and lower the arms 18 and 19. It will be understood that the reduction gearing (a portion only of which is shown) may be driven by any suitable means, such as an electric motor.

It will be noted that the arms 20 are mounted on a shaft 29, similar to that for operating the arms 18 and 19, and that operation of said shaft actuates the said arms 20 and 21 to raise and lower the same.

In the operation of the mechanism a bar or plate will be carried or advanced by the rollers 4 of the roller receiving table toward the front end of the machine. When the plate or bar has reached the desired position the shaft 29 will be rotated in a counter clockwise direction to cause the arms 18 to be elevated through the slots formed in the apron plates to lift the plate or bar from the said rollers. As the plate or bar is lifted it will slide downwardly along the inclined arms by which it is supported until the inner edge thereof engages the stops or pins 36 which project above the top side of the upper section of the bearing casing 24. Each of these pins or stops is slidably mounted in a vertical opening 37 formed in the bearing casings (Fig. 4). Each of the said pins or stops is reduced in size from near the middle to the lower end thereof to form a shoulder 38 with which a spring 39 which surrounds the reduced portion of the pin engages for urging the said pin or stop in an upward direction. The reduced lower end portion of each of the pins extends through alined openings 40 formed in top and bottom sides of the girder 12, the lower end of the said spring resting upon the inner side of the bottom of the said girder, as shown. As the arms 18 are elevated by rotation of the shaft 29 the plate or bar will be turned about its inner edge as an axis, which edge is in engagement with the stops 36, as described already. When the arms 18 have been elevated through an angle of approximately 45° laterally projecting lugs 41 formed on the hubs 25 of the arms 18 will strike the laterally projecting lugs 42 formed on the pins 36, causing downward movement of the latter. The operation of the pins is so timed with relation to the lifting of the receiving or lowering arms 19 that the top ends of the pins will be disengaged from the edge of the plate or bar by the time the said receiving arms have arrived in position to engage the side of the said plate or bar. When the pins have been depressed sufficiently the plate or bar will move by gravity along the arms 18 edgewise into the notches 43 formed in the top edges of the sides of the bearing casings. Further rotation of the arms 18 will cause further rotation of the plate or bar about its edge as an axis into engagement with the receiving or lowering arms 19. It will be observed that the arms 18 will have been oscillated through an angle slightly greater than 90° in order to insure that the plate or bar will be turned over and delivered to the receiving arms. The positions which the arms may attain at the limits of their upward movements are shown in dot and dash lines in Fig. 2. When the arms 19 have been brought into engagement with the plate or bar the shaft 29 is thereupon rotated in clockwise direction to cause the arms 19 to lower the plate or bar on to the rails 45 of the inspection table and to simultaneously lower the arms 18 into horizontal position. The said arms 19 normally extend downwardly at an angle of about 10° from the horizontal, as shown in Fig. 2. The supporting rails 45 of the inspection table are placed at intervals along the longitudinally extending I-beams 46, which are supported by the pedestals 47 in known manner. The arms 20 are disposed in spaced parallel relation with the rails 45 and with the lowering arms 19 so that the said arms may be operated without interfering with each other and without striking the said rails.

After a plate or bar has been delivered to the inspection table and the inspection thereof has been completed the said plate or bar is thereupon transferred to the roller delivery table by the lifting arms 20 and the lowering arms 21 which operate in substantially the same manner as the arms 18 and 19. It will be noted that the shaft 29 which operates the arms 20, 21, is operated in the same manner as the shaft 29 which operates the arms 18 and 19 except that the former is rotated clockwise to raise the arms 20. The plate or bar will or may be subsequently discharged from either end of the machine by means of the rollers 4 which are provided on the roller delivery table 3.

It now will be seen that I have provided a novel and efficient mechanism for turning over plates to inspect the same and for subsequently turning the said plates so that the top sides thereof will face upwardly when the same are delivered from the machine. By providing the stops for preventing edgewise movement of a plate or bar while the same is being elevated and turned over and while the lowering arms are being raised in position, the efficiency of the apparatus is greatly enhanced.

Having thus described my invention, what I claim and desire to secure by Letters Patent is:

1. In mechanism of the class described, the combination with a plurality of rollers for advancing a plate of metal through the said mechanism, of means disposed in contiguous relation to the said rollers for engaging and lifting the said plate from the said rollers and for turning over the said plate, said plate being slidable on said means, and movable means for engaging an edge of said plate to control the sliding movement thereof on said means.

2. In mechanism of the class described, the combination with a plurality of rollers for advancing a bar of metal through the said mechanism and supporting means disposed in adjoining relation thereto, of means for transferring the said bar from the said rollers to the said supporting means and for simultaneously turning over the said bar about one of the edges thereof as an axis, said plate being slidable on said second named means, and movable means for engaging an edge of said plate to control the sliding movement thereof on said second named means.

3. In mechanism of the class described, the combination of a plurality of rollers for advancing a bar of material toward one end of the said mechanism, means for supporting the said bar disposed in adjoining relation to the said rollers, arms for engaging and lifting the said bar from the said rollers and for rotating the same about one edge thereof as an axis, arms for receiving the said bar from the first named arms and for lowering the same onto the said means, means for simultaneously actuating the said lifting and lowering arms, and means adapted to be engaged by the said edge of the said bar for preventing lateral movements thereof during the period in which the said second named arms are being brought into position to receive the said bar.

4. In mechanism of the class described, the combination of a plurality of rollers for advancing a bar of material toward one end of the said mechanism, means for supporting the said bar disposed in adjoining relation to the said rollers, arms for engaging and lifting the said bar from the said rollers and for rotating the same about one edge thereof as an axis, arms for receiving and lowering the said bar on to the said supporting means, means for simultaneously actuating the said lifting and lowering arms, means adapted to be engaged by the said edge of the said bar for preventing lateral movement of the said bar during the period in which the second named arms are being brought into position to receive the said bar, and means for rendering the last named means inoperative whereby lateral movement of the said bar is permitted.

5. In mechanism of the class described, the combination of means for conveying a plate of material toward one end of the said mechanism, means for supporting said plate, said means being disposed in adjoining relation to the said conveying means, means for transferring said plate from the said conveying means to the said supporting means and for simultaneously turning over the said plate, means for conveying the said plate from the said mechanism, and means for transferring the said plate from the supporting means to the last named means and for simultaneously turning over the said plate.

6. In mechanism of the class described, the combination of means for conveying a plate of material toward one end of the said mechanism, means for supporting said plate located in adjoining relation to said first named means, means for lifting said plate from the first named means and for rotating the same about one edge thereof as an axis, means for receiving said plate and lowering the same on to said supporting means, means for simultaneously actuating said lifting and lowering means, means disposed in contiguous relation to said supporting means for conveying said plate from said machine, and means for transferring said plate from the said supporting means to the last named means and for simultaneously rotating the said plate about one edge thereof as an axis.

7. In mechanism of the class described, the combination of means for conveying a plate of material toward one end of the said mechanism, means located in adjoining relation to said conveying means for supporting said plate, a plurality of arms for lifting the said plate from the first named means, said arms being pivotally mounted and adapted to rotate the said plate about one edge thereof as an axis, a plurality of arms for receiving said plate and for lowering the same on to the said supporting means, means for simultaneously actuating said lifting and lowering arms, means interposed between said lifting and lowering arms for limiting edgewise movements of the said plate while the said lowering arms are being brought into position to receive the said plate, and means connected to said lifting arms for rendering said last named means inoperative when the said lowering arms have been brought into receiving position.

8. In mechanism of the class described, the combination of a plurality of arms for lifting a plate and for rotating the same about one edge thereof as an axis, a plurality of arms adapted to be lifted toward said lifting arms for engaging said plate and for lowering the same into horizontal position, means interposed between said arms for limiting edgewise movement of the said plate while the said lowering arms are being moved toward the said lifting arms, and means acting to displace said means.

9. In mechanism of the class described, the combination of a plurality of rollers for advancing a bar of material toward one end of the said mechanism, arms for engaging and lifting the said bar from the said rollers and for rotating the same about one edge thereof as an axis, arms for receiving the said bar from the first named arms and for lowering the same, means for simultaneously actuating the said lifting and lowering arms, and means for engaging the said edge of the said bar for preventing lateral movements thereof during the period in which the said second named arms are being brought into position to receive the said bar.

In testimony that I claim the foregoing as my invention, I have hereunto signed my name this 13th day of November, 1928.

EDWARD T. PETERSON.